F. B. Richardson.
Syringe.
No. 2,005. Reissued June 20, 1865.
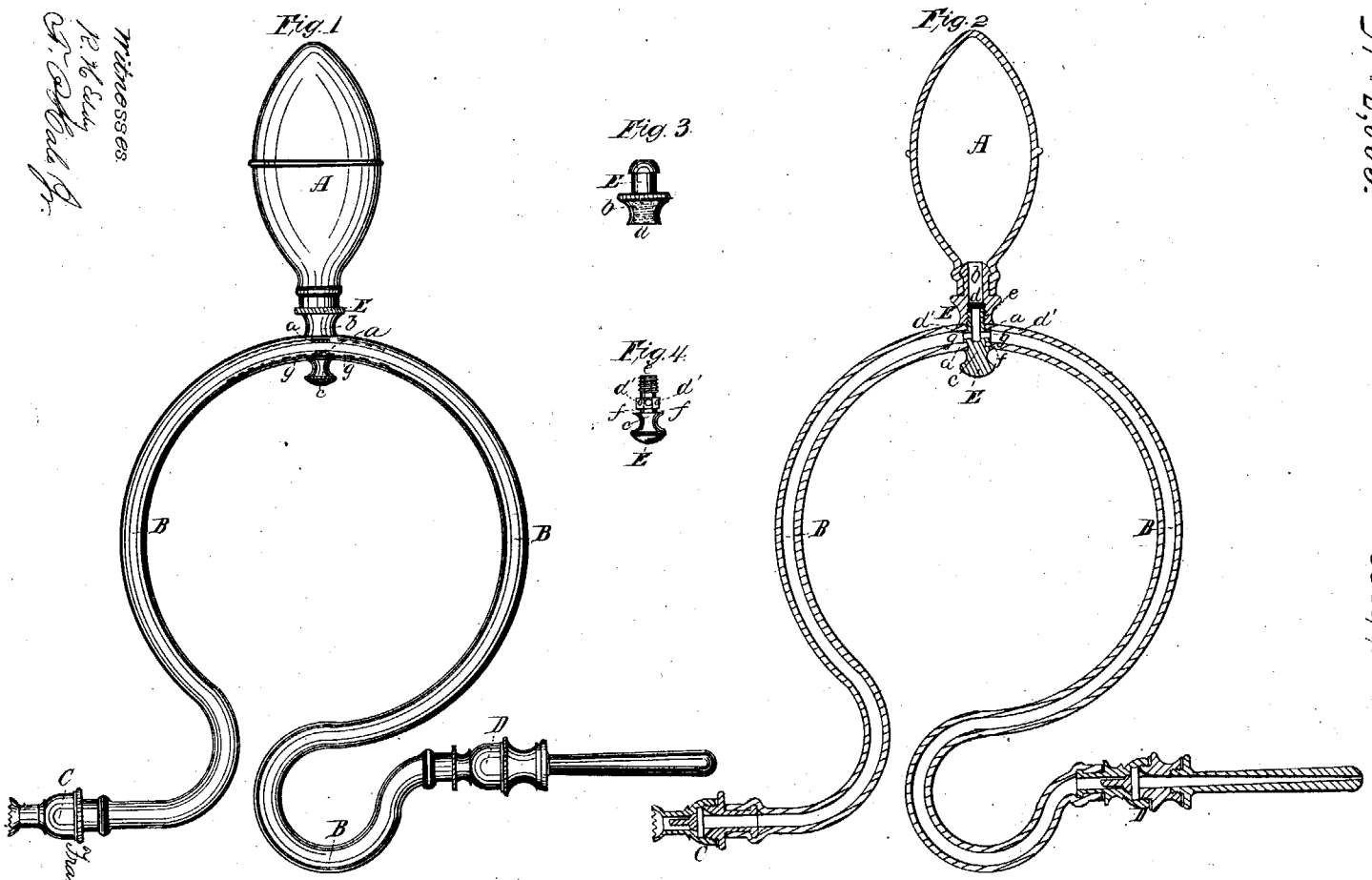
Witnesses.
R. H. Eddy
F. A. Hale Jr.
Inventor
Francis B. Richardson
N. PETERS, PHOTO-LITHOGRAPHER, WASHINGTON, D. C.

UNITED STATES PATENT OFFICE.

FRANCIS B. RICHARDSON, OF BOSTON, MASSACHUSETTS.

IMPROVEMENT IN ENEMA-SYRINGES.

Specification forming part of Letters Patent No. 31,626, dated March 5, 1861; Reissue No. 2,005, dated June 20, 1865.

*To all whom it may concern:*

Be it known that I, FRANCIS B. RICHARDSON, of Boston, in the county of Suffolk and State of Massachusetts, have invented a new and useful Improvement in the Enema-Syringes; and I do hereby declare the same ot be fully described in the following specification and illustrated in the accompanying drawings, of which—

Figure 1 is a front elevation, and Fig 2 a longitudinal section, of an elastic-bulb enema-syringe provided with my invention. Figs. 3 and 4 are separate views of the two parts of the metallic connection by which the elastic bulb and conduit are joined together.

In carrying out my invention with one single flexible and elastic conduit, instead of two such separate conduits or pipes of induction and eduction, as heretofore employed, I not only construct such conduit with a lateral perforation carried through its two opposite sides, but extend the metallic connection of the bulb through such perforation, and so fomr the parts that the elasticity of the conduit or pipe around the perforation may cause the latter to close or fit so about the extension of the metallic connection as to make therewith a tight joint or joints. I also make the metallic connection with one or more lateral passages to open into the bore of the elastic conduit and that of the said connection.

In the drawings, A denotes the elastic bulb. B is a caoutchouc elastic and flexible single pipe, which at its two extremities is connected with the valve-chamber C D. This pipe is made with a lateral perforation, *a*, which should lead through opposite sides of it and into its bore. The metallic connection E, on which the bulb is fixed, opens into the bulb, passes into such perforation, and opens into the bore of the tube, the perforation being made of a diameter less than that of the part received by it. By so making such perforation the elasticity of the material of which the tube may be composed will cause the tube to close tightly on the part extended through it and thus form therewith a tight joint or joints.

For the better security of tightness of the joint at the upper part of the perforation and for other purposes I construct the metallic connection in two parts, *b c*, and with screws *d e*, by which they may be joined together. The male-screw portion *c* I form with a shoulder, *d*, extending around it at the base of the screw. On this shoulder the tube about the perforation rests, and, besides, it is pressed against the shoulder by the female screw part *d* when the two parts *b c* are coupled together. In this way not only is a tight joint insured at the upper part of the perforation, but the pipe is maintained in place under a downward bend or strain on it. The part *c* may also have a groove extending around it to receive the lower part, *g*, of the pipe, which should be sprung into such groove. In this way the joint may be made closer than it can be without the groove.

In some respects my mode of applying the elastic bulb and its flexible pipe of induction and eduction is preferable to that which is usually termed a "threefold metallic connection"—that is, such as described and represented in a patent granted to me and another on May 8, 1860—for a threefold metallic connection, when constructed and applied as shown in such patent, requires two separate flexible pipes, whereas with my invention, as represented in the drawings, but one flexible pipe is employed. Furthermore, by making my metallic connection in two parts, *b c*, constructed and screwed together as described, the upper part, *b*, containing a female screw, answers when it and the bulb are removed together from the lower part, *e*, to receive a small terminal jet-tube, such as will be suitable for injecting a liquid either into the urethra, the eye, or ear of a person, and thus the bulb with such small tube may be employed as a syringe for delicate operations.

By employing one single flexible and elastic conduit, applied to the bulb as hereinbefore described and as represented in the drawings, we not only obtain close joints, but a stronger connection than is the case when two flexible conduits are applied to a threefold inelastic connection, as above described.

Having thus described my improvements, what I claim as my invention, and desire to have secured to me by Letters Patent, is—

So forming the connection between the bulb and its flexible tube that the bulb can be used separately with a jet-pipe, as well as with its flexible tube, thus adapting the syringe to all the various operations for which it may be required, as described.

FRANCIS B. RICHARDSON.

Witnesses:

JOSEPH GAVETT,

SAMEL. M. BARTON.